United States Patent
Hill et al.

(10) Patent No.: US 6,244,873 B1
(45) Date of Patent: Jun. 12, 2001

(54) WIRELESS MYOELECTRIC CONTROL APPARATUS AND METHODS

(75) Inventors: William Colyer Hill, Montville; Fernando Carlos Pereira, Westfield; Yoram Singer, Murray Hill; Loren Gilbert Terveen, Basking Ridge, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/419,376

(22) Filed: Oct. 15, 1999

Related U.S. Application Data
(60) Provisional application No. 60/104,534, filed on Oct. 16, 1998.

(51) Int. Cl.[7] ............................................. G09B 19/00
(52) U.S. Cl. .................. 434/236; 434/258; 434/365; 379/110.01; 379/368; 455/95; 455/557
(58) Field of Search .................. 434/236, 238, 434/247, 258, 307 R, 308, 365; 482/900; 463/36; 600/546, 554, 595; 345/156; 623/24; 607/20; 375/222, 136; 73/379.01; 379/167, 171, 172, 110.01, 354, 368–370; 342/13, 371; 455/91, 92, 95, 460, 550, 556, 557, 564

(56) References Cited

U.S. PATENT DOCUMENTS

| | | |
|---|---|---|
| 4,149,716 | 4/1979 | Scudder . |
| 4,516,939 * | 5/1985 | Crimmins, Jr. .................. 434/258 X |
| 4,650,492 * | 3/1987 | Barkhordar et al. .................. 623/24 |
| 4,771,344 * | 9/1988 | Fallacaro et al. ................. 434/247 X |
| 4,961,423 * | 10/1990 | Canducci .............................. 607/20 |
| 5,252,102 | 10/1993 | Singer et al. . |
| 5,372,365 * | 12/1994 | McTeigue et al. ............... 434/252 X |
| 5,482,051 | 1/1996 | Reddy et al. . |
| 5,679,004 | 10/1997 | McGowan et al. . |
| 5,692,517 | 12/1997 | Junker . |
| 5,888,213 * | 3/1999 | Sears et al. ............................ 623/24 |

FOREIGN PATENT DOCUMENTS

| | | |
|---|---|---|
| 1-256934 * | 10/1989 | (JP) . |
| 11-113866 * | 4/1999 | (JP) . |

OTHER PUBLICATIONS

A. J. Fuglevand et al., "Detection of motor unit action potentials with surface electrodes: influence of electrode size and spacing," *Biol. Cybern.*, vol. 67, 1992, pp. 143–153.

C. DeLuca et al., "Surface myoelectric signal cross–talk among muscles of the leg," *Electroencephalography and Clinical Neurophysiology*, vol. 69, 1988, pp. 568–575.

* cited by examiner

*Primary Examiner*—Joe H. Cheng

(57) ABSTRACT

Myoelectric and wireless technologies are used for the control of a portable electronic device, such as a cellular telephone or a personal digital assistant (PDA). That is, a portable electronic device has a wireless myoelectric user interface. An apparatus includes a material which forms a forearm or wrist band, myoelectric sensors attached to the band, a digital processor coupled to the myoelectric sensors, and a wireless transmitter coupled to the digital processor. The apparatus is operative to sense and detect particular hand and/or finger gestures, and to broadcast control signals corresponding to the gestures for operative control of the portable electronic device.

35 Claims, 6 Drawing Sheets

FIG. 6

| GESTURE | FUCTION |
|---------|---------|
| T-i | FORWARD/SCROLL UP |
| T-m | PLAY/SELECT |
| T-r | STOP/SCROLL DOWN |
| T-p | REWIND |

FIG. 7

| GESTURE-LH | GESTURE-RH | FUNCTION |
|------------|------------|----------|
| T-i | T-i | 1 |
| T-i | T-m | 2 |
| T-i | T-r | 3 |
| T-m | T-i | 4 |
| T-m | T-m | 5 |
| T-m | T-r | 6 |
| T-r | T-i | 7 |
| T-r | T-m | 8 |
| T-r | T-r | 9 |
| T-p | T-i | * |
| T-p | T-m | 0 |
| T-p | T-r | # |
| - | SNAP | SEND OR END |

WIRELESS MYOELECTRIC CONTROL APPARATUS AND METHODS

This application claims benefit of the priority of U.S. Provisional Application Serial No. 60/104534, filed Oct. 16, 1998.

BACKGROUND OF THE INVENTION

1. Field of the Invention

The present invention relates generally to the field of user interfaces for portable electronic devices, as well as to the field of wireless myoelectric control.

2. Description of the Related Art

Portable electronic devices have become increasingly popular. These devices can operate with the use of a small battery pack or battery cells. Examples of these devices include wireless or cellular telephones, personal digital assistants (PDAs), and audio or music delivery devices. Some devices have become increasingly small such that they are now deemed "pocketable" and/or "wearable."

A portable electronic device typically has a user interface for operative control. Most if not all conventional user interfaces for such portable electronic devices employ physical buttons, stylus, or voice control. In some devices, a large number of operations or functions are possible with the user interface.

One major shortcoming of a button or stylus-based user interface is that the user must physically retrieve and position the portable electronic device appropriately for physical contact therewith. In addition, as the size of a device becomes smaller, the interface becomes increasingly inappropriate from an ergonomic standpoint. The major shortcoming of a voice-controlled interface is that the user must speak openly in such a way that other nearby people may hear.

Myoelectric technologies are known and have been used for control in some applications. In U.S. Pat. No. 4,149,716, a head band with electrodes is used to generate signals for wired control of visual displays in a television display game. In U.S. Pat. No. 5,482,051, electromyographic sensors are placed on the back of a user's hand to provide for the realistic "squeezing of objects" in a virtual reality application. U.S. Pat. No. 5,252,102 discloses orthotic and prosthetic devices which are controlled with myoswitches in connection with wireless communication. As described in U.S. Pat. No. 5,679,004, a body suit has myoelectric sensors for contact with an arm, where the signals therefrom are broadcasted to a remote station for comparison of teacher and student motions. U.S. Pat. No. 5,692,417 describes the combined use of EEG and EMG signals to produce control signals for electronic musical instruments and video games. None of these patents describes a wireless myoelectric apparatus for operative control of a portable electronic device with a relatively large number of clearly discernible human commands.

Accordingly, there is an existing need to provide a convenient and easy-to-use user interface for small portable electronic devices.

SUMMARY OF THE INVENTION

As described herein, the inventive methods and apparatus involve the use of myoelectric and wireless technology for the control of a portable electronic device. That is, the inventive portable electronic device has a wireless myoelectric user interface.

In one aspect of the invention, the apparatus comprises a material which forms a band, myoelectric sensors attached to the band, a digital processor coupled to the myoelectric sensors, and a wireless transmitter coupled to the digital processor. The band is sized and configured to fit around a human forearm or wrist. In general, the apparatus is operative to sense and detect particular hand and/or finger gestures, and to broadcast control signals corresponding to the gestures for operative control of the portable electronic device.

The apparatus may employ a method of receiving and digitizing signals from the myoelectric sensors, determining whether a correlation exists between the digitized signal data and one of a plurality of prestored gesture patterns, selecting and generating a control signal or message associated with the prestored gesture pattern when a correlation exists, and modulating and transmitting a radio frequency (RF) signal with the control signal for control of the portable electronic device.

BRIEF DESCRIPTION OF THE DRAWINGS

FIG. 6 is a table showing exemplary detectable gestures of the wireless myoelectric apparatus of FIG. 1, exemplary controlled functions of the portable electronic device of FIG. 1, and exemplary relationships between such gestures and functions.

FIG. 7 is another table showing exemplary detectable gestures of the wireless myoelectric apparatus of FIG. 1, exemplary controlled functions of the portable electronic device of FIG. 1, and exemplary relationships between such gestures and functions.

DETAILED DESCRIPTION OF THE PREFERRED EMBODIMENTS

Figure 1:
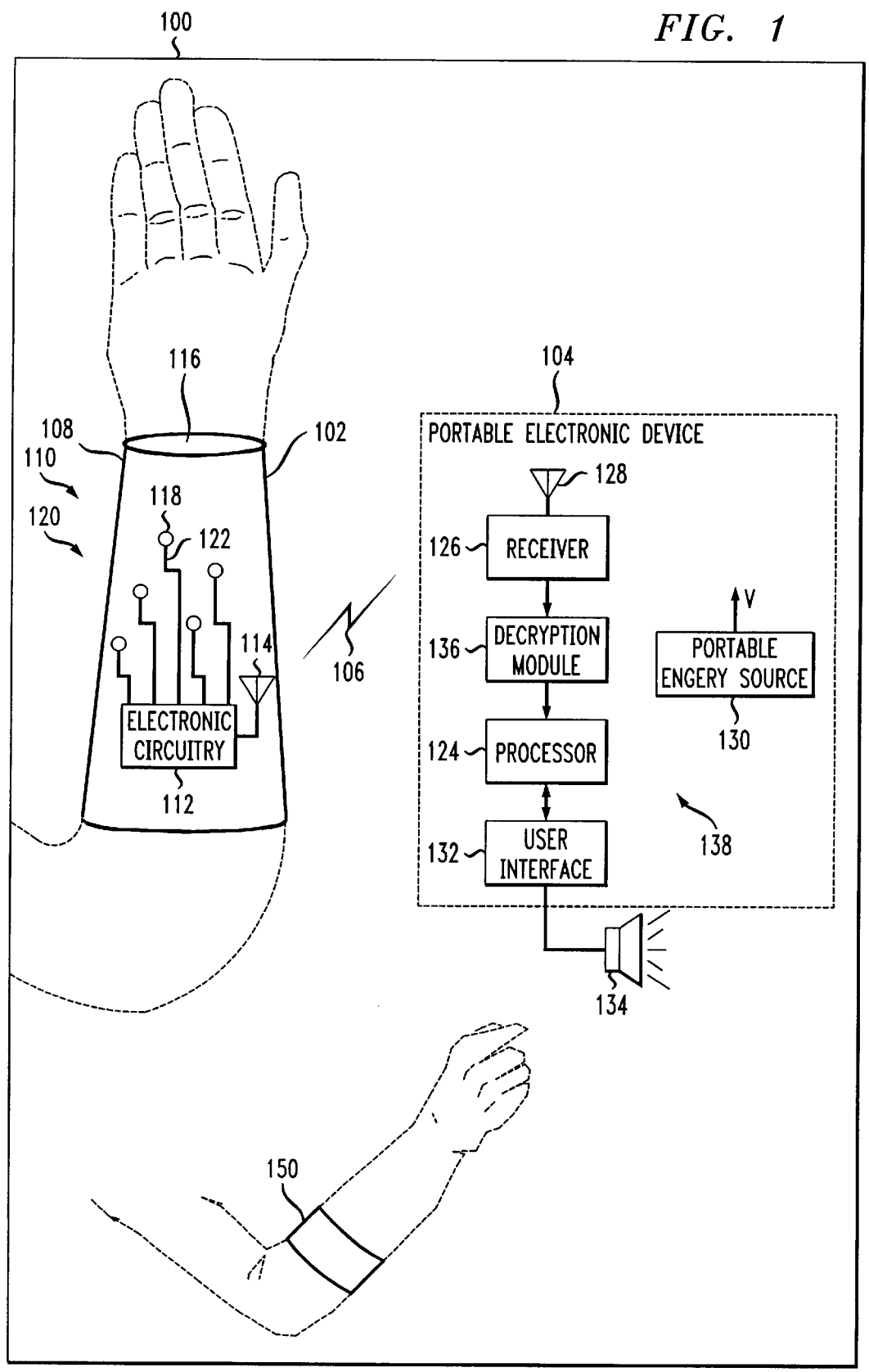
FIG. 1 is a diagram of a wireless communication system having a wireless myoelectric apparatus and a portable electronic device.

FIG. 1 is a diagram of a wireless communication system 100 including a wireless myoelectric apparatus 102 and a portable electronic device 104. Apparatus 102 is operative to communicate to portable electronic device 104 via radio frequency (RF) signals 106 or other suitable over-the-air signals.

Apparatus 102 includes a material which forms a band 108, myoelectric sensors 110, electronic circuitry 112, and an antenna 114. Band 108 has a hole 116, and is sized and configured to fit around a human forearm in a "snug-fit" fashion. Band 108 may be referred to as a "sleeve." In the preferred embodiment, the material of band 108 is elastic, and may be made of well-known spandex or spandex-like material. Thus, band 108 may be stretched for attachment to and detachment from the forearm. In an alternate embodiment, the material of band 108 is a sheet of cloth having snaps or Velcro™ for attachment and detachment. In another embodiment, two bands with myoelectric sensors are used; one for the left forearm and a similar one for the right forearm.

The band may be alternatively sized and configured to cover a part of the forearm that is smaller than that shown as being covered by band 108. As an example, FIG. 1 shows a band 150, which may be referred to as a "wristband". Band 150 has a dimension along the length of the forearm that is smaller than that shown by band 108. This dimension may be about three inches (7.62 cm), for example, but may vary; for example, the dimension may vary from around one inch (5.08 cm) to five inches (12.7 cm). Preferably, band 150 is not suited to cover most of the forearm, but rather to cover only an upper part of the forearm (e.g., where the muscle is the thickest). Left and right wristbands may be used in combination as well.

Myoelectric sensors 110, such as a myoelectric sensor 118, are coupled to electronic circuitry 112 via conductors 120, such as a conductor 122. Myoelectric sensors 110 may be adhesively attached to band 108, and conductors 120 may be embedded within and/or carried on band 108. In any case, each of myoelectric sensors 110 is attached to and carried on band 108 such that, when the forearm carries the band 108, the myoelectric sensor makes contact with the outer surface of the forearm.

Electronic circuitry 112, which is described below in relation to FIG. 2, may be carried on band 108 as indicated in FIG. 1. In one embodiment, electronic circuitry 112 is carried in a pocket (not shown) of band 108. The pocket may be formed to completely enclose electronic circuitry 112, or remain partially open. In an alternate embodiment, electronic circuitry 112 is not carried on band 108 but rather contained outside of band 108, carried in a small housing (not shown), and coupled to myoelectric sensors 110 and/or conductors 120 via wires (not shown). Electronic circuitry 112 is coupled to antenna 106 which is configured to send commands via RF signals 106 to portable electronic device 104.

Figure 2:
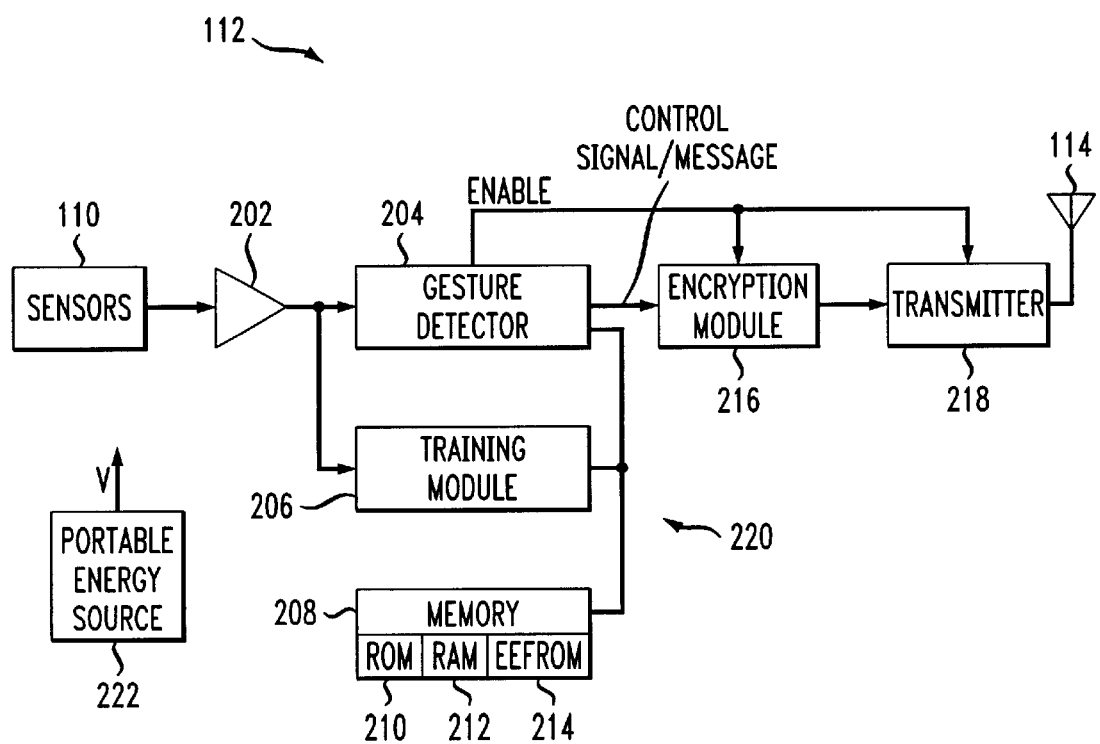
FIG. 2 is a schematic block diagram of electronic circuitry of the wireless myoelectric apparatus of FIG. 1.

FIG. 2 is a schematic block diagram of electrical circuitry 112 of wireless myoelectric apparatus 102 of FIG. 1. Electronic circuitry 112 includes myoelectric sensors 110, a signal amplifier 202, a gesture detector 204, a training module 206, memory 208, an encryption module 216, a transmitter 218, and antenna 114, coupled as indicated in FIG. 2. Memory 208 may include a read-only memory (ROM) 210, a random access memory (RAM) 212, and an electrically-erasable/programmable ROM (EEPROM) 214. Preferably, gesture detector 204, training module 206, and at least portions of memory 208 are included in a digital processor 220. Myoelectric sensors 110 of FIG. 2 refers to the sensors from the one or more bands in use. To provide energy for electronic circuitry 112, a portable energy source 222 is included. Portable energy source 222 may include a battery pack or one or more battery cells.

Referring back to FIG. 1, portable electronic device 104 generally includes electronic circuitry 138 carried in a housing (see outline of 104). Electronic circuitry 138 shown in FIG. 1 allows for communication and control of portable electronic device 104 by apparatus 102. Electronic circuitry 138 includes a processor 124, a receiver 126, an antenna 128, a user interface 132 (which may include an earpiece or headset 134), and a decryption module 136, coupled as indicated.

Examples of portable electronic device 104 include a portable audio player (having an AM/FM radio, tape cassette, and/or compact disc (CD) player), a wireless or cellular telephone, a personal digital assistant (PDA), a computer, a calculator, to name a few. As apparent, the electronic circuitry of portable electronic device 104 may include circuitry and devices in addition to electrical circuitry 138 shown in FIG. 1, and will depend on the particular chosen application.

Portable electronic device 104 may be freely carried by a user since it can operate without externally fixed wired connections. To make this possible and convenient, electronic circuitry 138 is powered by a portable energy source 130 which is carried by the housing. Portable energy source 130 may include a battery pack or one or more battery cells. Portable electronic device 104 also has a small size and a light weight. In one embodiment, portable electronic device 104 is sized to fit within a hand of a user; it may be referred to as a "hand-held" device. Portable electronic device 104 may be small enough to be considered "wearable" or "pocketable". For example, portable electronic device 104 may have dimensions no greater than 3"×4"×½", and a weight no greater than eight ounces. Thus, a user may carry or wear portable electronic device 104 outside of his/her view and accessibility, while listening to audio from portable electronic device 104 via earpiece 134.

Generally, apparatus 102 is a wireless myoelectric interface for portable electronic device 104. Put another way, portable electronic device 104 has a wireless myoelectric user interface. In one embodiment, the conventional user interface 132 of portable electronic device 104 does not exist (except for perhaps earpiece 104) and the wireless myoelectric interface is the primary user interface for portable electronic device 104. That is, buttons or stylus that would otherwise be present are missing from portable electronic device 104. In another embodiment, conventional user interface 132 is present but may overridden by apparatus 102.

Figure 3:
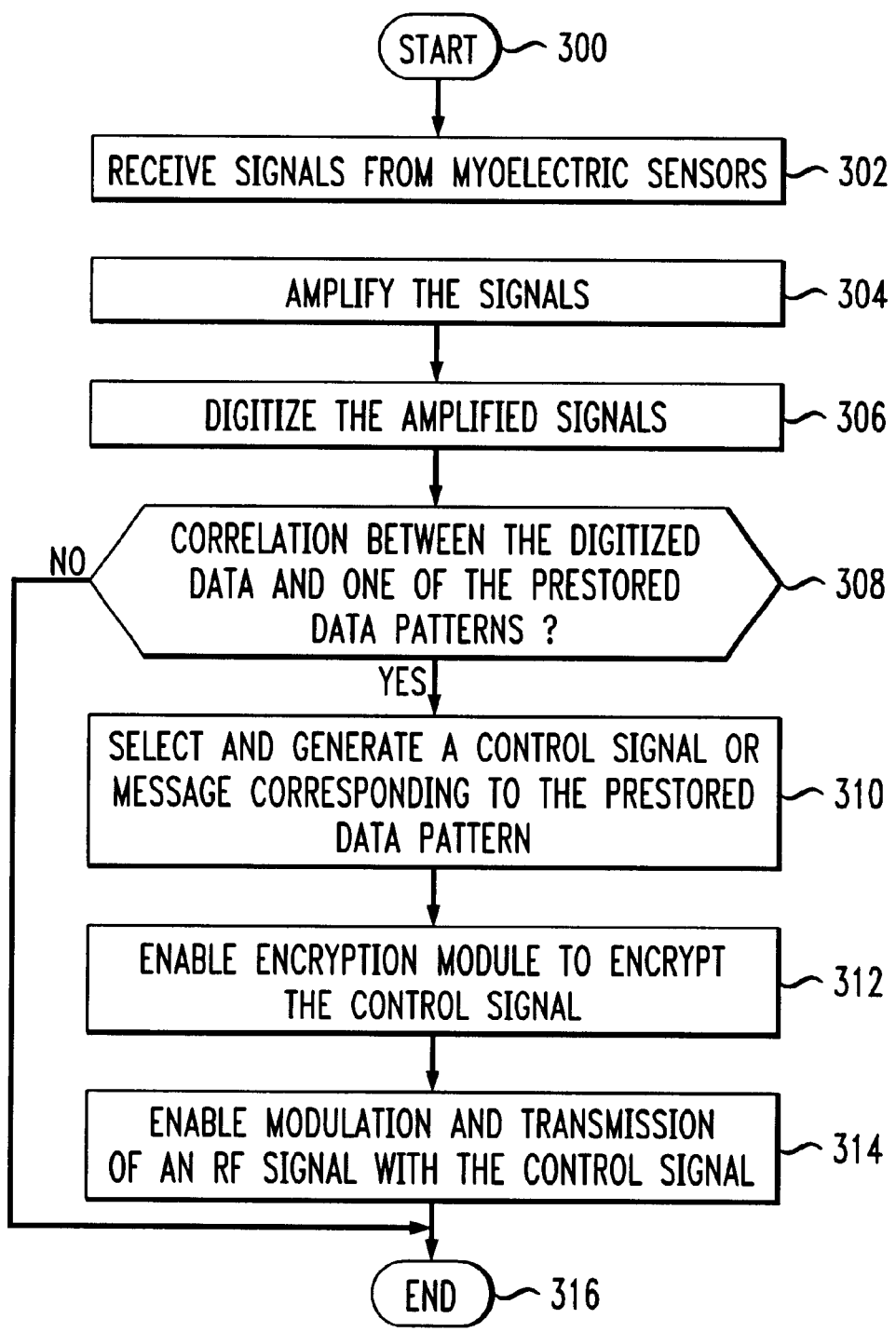
FIG. 3 is a flowchart describing a method of processing myoelectric sensor signals which may be carried out by the wireless myoelectric apparatus of FIG. 1.

FIG. 3 is a flowchart describing a method of processing myoelectric sensor signals. This method may be carried out by wireless myoelectric apparatus 102. As apparent, at least some steps of the methods described herein are embodied and implemented in connection with software and a digital processor. In the following description, FIGS. 2 and 3 will be referred to in combination with FIG. 1.

A user has band 108 attached to his/her forearm or wrist. As the user moves hands and fingers, myoelectric sensors 110 pick up electrical signals from muscles that control the hands and fingers. Beginning at a start block 300 of FIG. 3, signals from myoelectric sensors 110 are received (step 302), amplified by signal amplifier 202 (step 304), and digitized by digital processor 220 (step 306). Gesture detector 204 detects whether a correlation exists between the digitized data and one of several prestored data patterns in memory 208 (step 308). Each one of the prestored data patterns corresponds to a particular gesture that is uniquely detectable by gesture detector 204. Preferably, these patterns are stored in EEPROM 214, and may be transferred to RAM 212 during operation.

If no correlation exists at step 308, the flowchart ends at an end block 316. If a correlation exists at step 308, gesture detector 204 selects and generates a control signal or message that corresponds to the prestored data pattern (step 310). The control signal or message may be referred to or regarded as a "command" for portable electronic device 104. Next, gesture detector 204 enables encryption module 216 to encrypt the control signal or message (step 312). Gesture detector 204 also enables transmitter 218 so that an RF signal is modulated by the control signal or message and transmitted from antenna 114 (step 314) (see RF signals 106). Assuming portable electronic device 104 is within close proximity to apparatus 102, portable electronic device 104 will receive RF signals 106. Other electronic devices within close proximity will receive RF signals 106 as well. The flowchart ends at the end block 316, but the method may be repeated for continuous operation.

Figure 4:
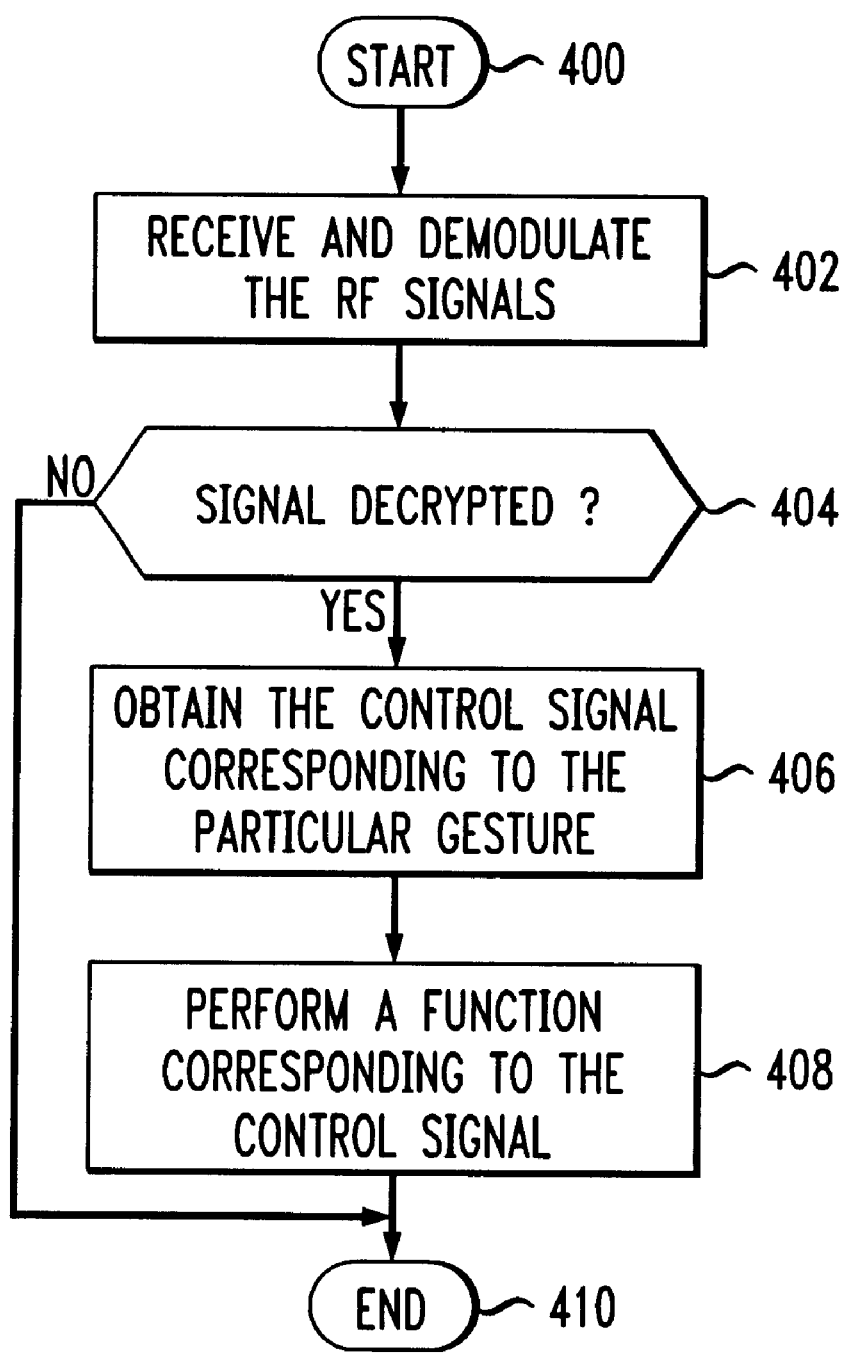
FIG. 4 is a method of processing control signals which may be carried out by the portable electronic device of FIG. 1.

FIG. 4 is a flowchart describing a method of processing control signals or commands. This method may be carried out by portable electronic device 104 of FIG. 1. This method may follow or occur at substantially the same time as the method of FIG. 3.

Beginning at a start block 400 of FIG. 4, antenna 128 and receiver 126 receive and demodulate RF signals 106 broadcasted by apparatus 102 (step 402). Decryption module 136 attempts to decrypt the received signals (step 404). If the signals cannot be decrypted at step 404, then the flowchart ends at an end block 410. If the signals are decrypted at step 404, processor 124 obtains the control signal or message corresponding to the particular gesture (step 406). Advantageously, the signals can only be decrypted by portable electronic device 104 and not other nearby devices. Processor 124 uniquely associates the control signal or message with a particular function. Once the association is made, processor 124 performs that function (step 408). The flowchart ends at an end block 410, but may be repeated for continuous operation.

Preferably, the user receives confirmation for whether a particular gesture has been detected and/or acted upon by portable electronic device 104. The confirmation may be provided at and by apparatus 102 (given an appropriate user interface), or at and by portable electronic device 104 (e.g., appropriate audio provided at earpiece 134). This confirmation may take place after step 308 of FIG. 3, or around steps 406 and 408 of FIG. 4.

FIG. 6 is a table showing exemplary detectable gestures of wireless myoelectric apparatus 102 of FIG. 1, exemplary controlled functions of the portable electronic device 104 of FIG. 2, and exemplary relationships between such gestures and functions. The table in FIG. 6 shows four finger gestures detectable by gesture detector 204, where each gesture is uniquely associated with a function of portable electronic device 104. In the table, symbols are used to denote the finger gestures. Here, "T" signifies the thumb, "i" signifies the index finger, "r" signifies the ring finger, and "p" signifies the pinky finger. A dash "-" is used between these signifiers to indicate physical contact therebetween. For example, a gesture "T-r" indicates the thumb in contact with the ring finger of the same hand.

As indicated in FIG. 6, the thumb in contact with the index finger corresponds to a "forward" command or function; the thumb in contact with the middle finger corresponds to a "play" command or function; the thumb in contact with the ring finger corresponds to a "stop" command or function; and the thumb in contact with the pinky finger corresponds to a "rewind" command or function. As apparent, these or similar functional associations may be used in, for example, audio/video player applications, voice mail retrieval applications, etc.

As alternatively indicated in FIG. 6, the thumb in contact with the index finger corresponds to a "scroll up" command or function; the thumb in contact with the middle finger corresponds to a "select" command or function; and the thumb in contact with the ring finger corresponds to a "scroll down" command or function. As apparent, these or similar functional associations may be used in, for example, scrolling through long data lists, selecting prestored telephone numbers for dialing, voice mail applications, etc.

FIG. 7 is another table showing other exemplary detectable gestures of apparatus 102 of FIG. 1, exemplary controlled functions of portable electronic device 104 of FIG. 1, and exemplary relationships between such gestures and functions. The table in FIG. 7 shows thirteen finger gestures detectable by gesture detector 204, where each gesture is uniquely associated with a function of portable electronic device 104. In FIG. 7, the same symbols are used as in the table of FIG. 6. Here, however, the control is provided by gestures from both hands, the left hand ("LH") and the right hand ("RH").

As indicated in FIG. 7, combinations of simultaneous gestures from both the left and right hands may be associated with a particular function. For example, the number "1" is selected in response to the left thumb being in contact with the left index finger while the right thumb is in contact with the right index finger; the number "2" is selected in response to the left thumb being in contact with the left index finger while the right thumb is in contact with the right middle finger. Similarly, the number "4" is selected in response to the left thumb being in contact with the left middle finger while the right thumb is in contact with the right index finger; the number "5" is selected in response to the left thumb being in contact with the left middle finger while the right thumb is in contact with the right middle finger, etc. As apparent, these or similar functional associations may be used in, for example, selecting from one of many retrievable items, manually selecting telephone numbers for dialing, etc, Also as indicated in FIG. 7, a right hand "snap" between the right thumb and the right middle finger provides a "SEND" command or an "END" command, depending on what state portable electronic device 104 is in. For example, if portable electronic device 104 provides cellular telephone functionality, the right hand snap provides a "SEND" command or function when portable electronic device 104 is in an idle or standby mode, and an "END" command or function when portable electronic device 104 is in a talk or communication mode. As another example, if portable electronic device 104 provides telephone functionality, the right hand snap provides an "OFF-HOOK" command or function when portable electronic device 104 is on-hook and an "ON-HOOK" command or function when portable electronic de vice 104 is off-hook. As another example, the right hand snap provides a "POWER-UP" command or function when portable electronic device 104 is powered down, and a "POWER-DOWN" command or function when portable electronic device 104 is powered up.

Preferably, apparatus 102 employs what are referred to as "gesture-activated transmission" and "gesture-activated interface enabling." "Gesture-activated transmission" allows for the enabling and disabling of the RF broadcast based on whether any gestures are detected. That is, when a gesture is detected, the transmitter is enabled and RF signals are broadcasted; when no gesture is detected, the transmitter is disabled and no RF signals are broadcasted. More precisely, when a gesture is detected, the transmitter is enabled for a first predetermined time period before the command is sent. After the command is sent, the transmitter remains enabled for a second predetermined time period. If no other gesture is detected during the second predetermined time period, the transmitter is disabled and the RF signal broadcast ceases. If another gesture is detected during the second predetermined time period, however, the next command is immediately sent and the second predetermined time period is reset so that the RF broadcast is maintained for that time. In addition to prolonging battery life, this feature allows for sufficient signal hysteresis and receiver "pre-time" in order to adequately receive signals and commands.

On the other hand, "gesture-activated interface enabling" allows for the enabling and disabling of gesture commands based on a predetermined gesture. As an example, a right hand snap may activate the gesture interface and a left hand snap may deactivate the gesture interface. Given a right hand snap, commands and functions are issued and performed "as normal" for some set of predetermined gestures (e.g., those in FIG. 6). That is, the right hand snap "enables" the commands. However, no commands or functions are issued or performed for any predetermined gestures following a left hand snap, until the right hand snap is again given. This feature allows for the convenient activation and deactivation of the interface when necessary. Any suitable gestures may be applied, and the same gesture may provide for both activation and deactivation using concepts similar to that described in relation to the "SEND" and "END" functions in FIG. 7.

Figure 5:
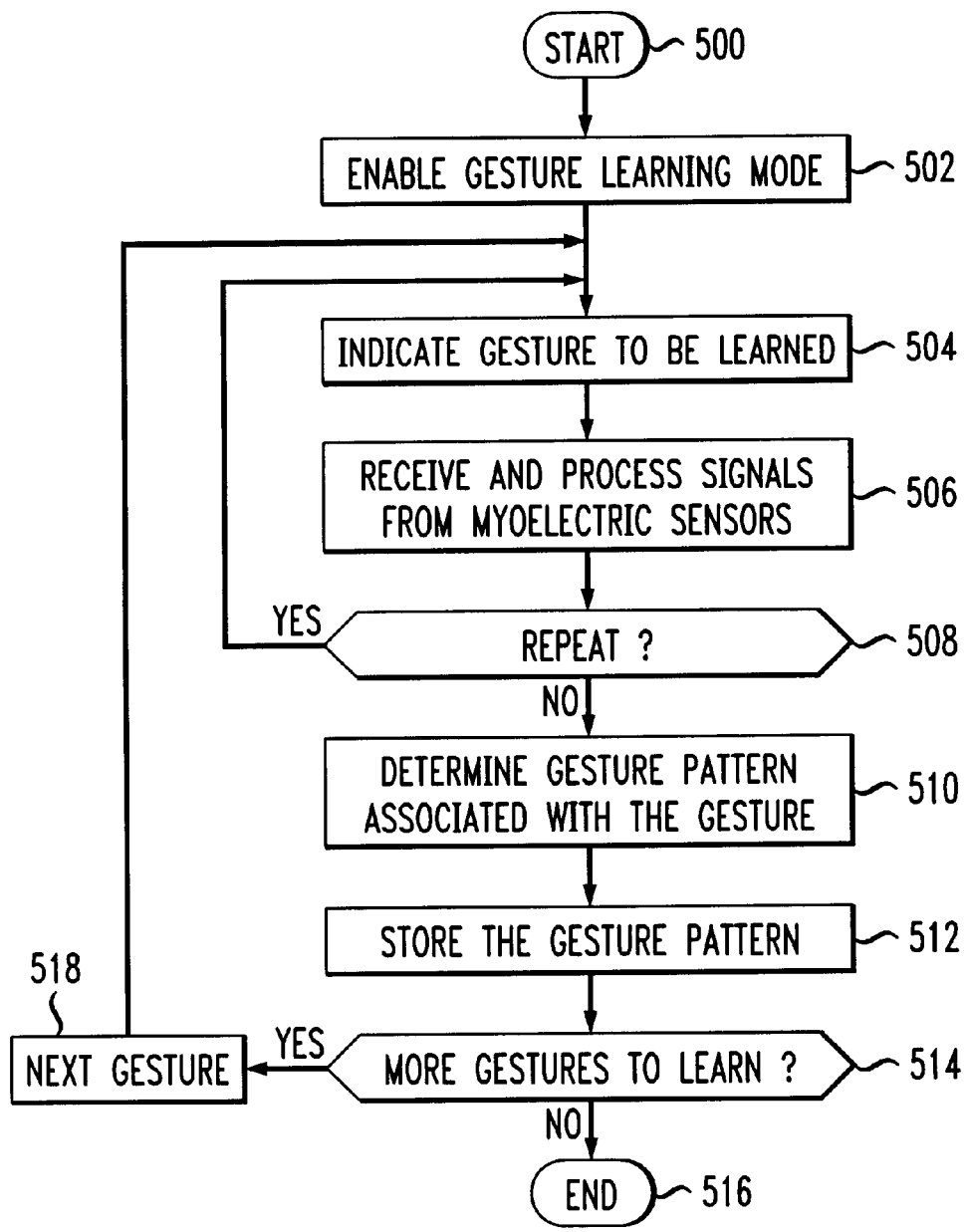
FIG. 5 is a flowchart describing a method of learning gestures which may be carried out by the wireless myoelectric apparatus of FIG. 1.

Referring now to FIG. 5, a flowchart describing a method of learning gestures is shown. This method may be carried out by wireless myoelectric apparatus 102 of FIG. 1, which may be referred to as a wireless adaptive myoelectric interface ("WAMI") in this context. Beginning at a start block 500, a "gesture learning mode" is enabled for apparatus 102. This mode may be activated at initial powerup (prior to any operation), in response to a particular gesture or activation, or in response to a detection of some error between incoming gestures and prestored patterns. Once the gesture learning mode is enabled at step 502, an indication is provided as to what gesture is to be learned (step 504). This indication may be provided at and by apparatus 104, but preferably it is provided at and by portable electronic device 104 (e.g., an audio indication at earpiece 134).

In response, the user performs the indicated gesture and signals are generated at myoelectric sensors 110. Digital processor 220 and training module 206 receive and process the signals (step 506), and store the results in memory 208. As indicated at step 508, the same gesture and processing may be repeated for a predetermined number of repetitions or until training module 206 is "satisfied" with the data already received. After any repetition of the gesture, training module 206 determines a gesture pattern associated with the gesture (step 510) and stores it in memory 208 (step 512). Preferably, the gesture pattern is stored in EEPROM 214.

If there are no more gestures to learn at step 514, the flowchart ends at an end block 516. If there are more gestures to learn at step 514, the next gesture is selected (step 518) and the method repeats at step 504. The number of gestures to learn for portable electronic device 104 may be relatively large, and in some implementations on the order of 10–20 gestures. The number and the positioning of myoelectric sensors 110 and the discernability of digital processor 220 are collectively configured so that detection is possible with a relative large number of hand gestures, such as those indicated in FIGS. 6 and 7. As one example, one to three myoelectric sensors 110 are positioned on band 108 so that twenty or more finger or hand gestures can be recognized.

Thus, training module 206 as described in relation to FIG. 5 allows for accurate learning for a given individual. Preferably, the determining of the gesture patterns is performed using a discriminative algorithm. The learning algorithm first maps the high dimensional myoelectric recordings into an internal compact representation. Next, a machine learning technique called "boosting" is used to find a set of discriminative features. Finally, the features are combined into a single highly accurate, yet compact, gesture classifier. For best performance, special attention is given to potential crosstalk from synchronous muscle activations as described in "Surface Myoelectric Crosstalk among Muscles Of The Leg," C. DeLuca, R. Merletti, EEG & Clin. Neurophysiol., vol. 69, pp. 568–575, 1988, and "Detection Of Motor Unit Action Potentials With Surface Electrodes: Influence Of Electrode Size And Spacing," A. Fuglevand et al., Biol. Cybern., vol. 67, pp. 143–153, 1992.

As described, the inventive wireless myoelectric control apparatus is suitable for use in operating a portable electronic device. The wireless myoelectric control apparatus may include a material which forms a forearm or wrist band, one or more myoelectric sensors carried on the band; a digital processor coupled to the myoelectric sensors; and a wireless transmitter coupled to the digital processor.

In other inventive aspects, a battery-operable portable electronic device has a wireless myoelectric user interface. This device may have a housing and electronic circuitry carried in the housing. The electronic circuitry includes at least part of the wireless myoelectric user interface (e.g., the wireless receiver).

In yet other aspects, an apparatus includes one or more myoelectric sensors; a gesture detector coupled to said myoelectric sensors; an output of said gesture detector providing a portable electronic device command corresponding to a detected gesture; a wireless transmitter coupled to the output of said gesture detector; and an antenna coupled to said wireless transmitter.

The apparatus may employ a method of receiving and digitizing signals from the myoelectric sensors, determining whether a correlation exists between the digitized signal data and one of a plurality of prestored gesture patterns, selecting and generating a control signal or message associated with the prestored gesture pattern when a correlation exists, and modulating and transmitting a radio frequency (RF) signal with the control signal for control of the portable electronic device.

Also, an inventive method of processing myoelectric sensor signals comprises the steps of receiving myoelectric sensor signals indicative of one of a plurality of hand or finger gestures, where the plurality of gestures includes a first gesture which reflects contact between a thumb and an index finger of a human hand, a second gesture which reflects contact between the thumb and a middle finger of the human hand, and a third gesture which reflects contact between the thumb and a ring finger of the human hand; detecting one of the plurality of gestures based on the myoelectric sensor signals; and selectively issuing one of a plurality of commands based on the detected gesture The methods described have been used in connection with apparatus 102 and portable electronic device 104. However, the methods may be employed between apparatus 102 and a number of wireless-controlled devices that are owned and operated by the user (including portable electronic device 104).

As readily apparent, the inventive aspects described herein provide several advantages in the field of myoelectric control. The present invention is a more particular breakthrough in connection with user interfaces for portable electronic devices. Thus, the scope of the invention should be understood to be quite broad and warrant a broad range of equivalent structures and functionalities.

What is claimed is:

1. A wireless myoelectric control apparatus suitable for use in operating a portable electronic device, comprising:
   a material which forms a forearm or wrist band;
   one or more myoelectric sensors carried on said band;
   a processor;
   said processor coupled to said myoelectric sensors;
   memory for storing gesture pattern data indicative of a plurality of gestures, each gesture corresponding to a unique one of a plurality of portable electronic device commands;
   said processor operative to compare myoelectric sensor signals with the gesture pattern data and to select one of the portable electronic device commands corresponding to a gesture that correlates with the myoelectric sensor signals;
   a wireless transmitter; and
   said wireless transmitter coupled to said processor and operative to wirelessly transmit the portable electronic device command.

2. The apparatus according to claim 1, wherein said processor is further operative to digitize said myoelectric sensor signals and to compare the digitized signals with the gesture pattern data.

3. The apparatus according to claim 1, further comprising:
   an encryption module; and
   said encryption module operative to encrypt the transmission from said wireless transmitter.

4. The apparatus according to claim 1, wherein said wireless transmitter is maintained in a non-transmitting state until the myoelectric sensor signals correlate with the gesture pattern.

5. The apparatus according to claim 1, wherein said processor further comprises a training module for programming the gesture pattern data in said memory based on actual user gestures.

6. The apparatus according to claim 1, wherein said material is elastic.

7. The apparatus according to claim 1, further comprising:
   an antenna; and
   said antenna coupled to said wireless transmitter.

8. An apparatus, comprising:
   one or more myoelectric sensors;
   a processor;
   said processor coupled to said myoelectric sensors via electrical conductors;
   an output from said processor providing one of a plurality of a portable electronic device input commands corresponding to a detected gesture, the plurality of portable electronic device input commands for invoking a plurality of user-interface functions of a portable electronic device;
   a wireless transmitter coupled to the output from said processor; and
   an antenna coupled to said wireless transmitter.

9. The apparatus according to claim 8, further comprising:
   a training module for training said apparatus to detect gestures for a particular user.

10. The apparatus according to claim 8, further comprising:
    memory;
    said memory coupled to said processor;
    said memory for storing a plurality of gesture patterns, each gesture pattern corresponding to a unique one of the plurality of portable electronic device input commands; and
    said processor operative to compare myoelectric sensor signal data with the plurality of gesture patterns and to select the portable electronic device input command that corresponds to a gesture pattern substantially matching with the myoelectric sensor signal data.

11. A battery-operable portable telephone having a wireless user interface comprising:
    electronic circuitry, including:
       a wireless receiver;
       said wireless receiver operative to receive a user interface command that corresponds to a detected physical gesture of an end-user of the portable telephone;
       a processor; and
       said processor operative to receive and process the received user interface command.

12. The portable telephone according to claim 11, further comprising:
    said processor being further operative to execute a predetermined function of the portable telephone that corresponds to the user interface command received by said wireless receiver.

13. The portable telephone according to claim 12, wherein the portable telephone comprises a cellular telephone.

14. A method of processing myoelectric sensor signals for use in invoking a plurality of predetermined functions of a portable electronic device, comprising:
    receiving myoelectric sensor signals indicative of one of a plurality of hand or finger gestures;
    detecting one of the plurality of gestures based at least in part on a positive correlation between the myoelectric sensor signals and predetermined gesture data; and
    selectively issuing one of a plurality of commands associated with the detected gesture for invoking one of the predetermined functions of the portable electronic device.

15. The method according to claim 14, further comprising:
    transmitting the command with a wireless transmitter.

16. The method according to claim 15, further comprising:
    prior to transmitting, amplifying the myoelectric sensor signals; and
    prior to transmitting, digitizing the amplified myoelectric sensor signals.

17. The method according to claim 14, further comprising:
    in response to detecting, activating a wireless transmitter to transmit the command.

18. The method according to claim 14, wherein the plurality of hand or finger gestures includes a first gesture which reflects contact between a thumb and an index finger of a human hand, a second gesture which reflects contact between the thumb and a middle finger of the human hand, and a third gesture which reflects contact between the thumb and a ring finger of the human hand.

19. A wireless apparatus for invoking functions of a portable wireless telephone device, comprising:
    a processor coupled to at least one sensor via electrical conductors;
    memory for storing a plurality of gesture patterns;
    said processor operative to compare sensor signal data with the plurality of gesture patterns, to detect a substantial match between the sensor signal data and one of the plurality of gesture patterns, and to select one of a plurality of user input commands associated with the match, wherein the plurality of user input commands correspond to a plurality of user-invokable functions of the portable wireless telephone device; and a wireless transmitter coupled to said processor and operative to wirelessly transmit the user input command to the portable wireless telephone device.

20. The wireless user interface according to claim 19, wherein the plurality of user input commands comprise telephone digit selection commands.

21. The wireless user interface according to claim 19, wherein the plurality of user input commands comprise a SEND call command and an END call command.

22. The wireless user interface according to claim 19, wherein the plurality of user input commands comprise a scroll forward command and a scroll backward command.

23. The wireless user interface according to claim 19, wherein the wireless user interface is configured for use with a portable wireless telephone device comprising a cellular telephone.

24. The wireless user interface according to claim 19, wherein said wireless transmitter is maintained in a non-transmitting state until said processor detects a substantial match between the sensor signal data and one of the plurality of gesture patterns.

25. The wireless user interface according to claim 19, further comprising:

said processor being further operative to program said memory with the plurality of gesture patterns during a training session with the user.

26. An apparatus for controlling the operation of a portable electronic device, the portable electronic device having a plurality of user-invokable functions uniquely associated with a plurality of input command messages, the apparatus comprising:

a processor coupled to at least one sensor;

said processor operative to detect a correlation between sensor signals and one of a plurality of prestored signal patterns and to select a user input command message that is uniquely associated with such correlation;

a wireless transmitter coupled to said processor;

said wireless transmitter operative to maintain a non-transmitting state when said processor fails to detect any correlation; and said wireless transmitter operative to maintain a transmitting state during transmission of the input command message to the portable electronic device in response to said processor detecting the correlation.

27. The apparatus according to claim 26, wherein said apparatus is for controlling the operation of a portable electronic device comprising a portable wireless telephone.

28. The apparatus according to claim 26, wherein said apparatus is for controlling the operation of a portable electronic device comprising a battery-operable portable cellular telephone.

29. The apparatus according to claim 26, wherein said at least one sensor comprises at least one user-wearable myo-electric sensor.

30. A portable electronic device comprising one of a wireless telephone, a cellular telephone, an audio player, a personal digital assistant, and a computer, the portable electronic device comprising:

an antenna;

a wireless receiver coupled to said antenna;

said wireless receiver operative to wirelessly receive one of a plurality of user-interface command messages, each user-interface command message uniquely corresponding to one of a plurality of detected physical gestures of an end-user of the portable electronic device;

a processor coupled to said wireless receiver; and said processor configured to execute, in response to the user-interface command message, one of a plurality of predetermined user-interface functions that uniquely corresponds to the user-interface command message received by said wireless receiver.

31. The portable electronic device according to claim 30, further comprising:

a decryption module for decrypting signals received from said wireless receiver.

32. The portable electronic device according to claim 30, further comprising:

a speaker providing an audio indication when said processor executes the user-interface function.

33. The portable electronic device according to claim 30, wherein the user-interface command message corresponds to one of a scroll forward function and scroll backward function.

34. The portable electronic device according to claim 30, wherein the user-interface command message corresponds to one of a SEND call function and an END call function.

35. The portable electronic device according to claim 30, wherein the user-interface command message corresponds to a select function for selecting a data item.

* * * * *